(No Model.)
H. W. MORTON.
TRANSMITTING MECHANISM FOR MOTORS AND DYNAMOS.
No. 489,026. Patented Jan. 3, 1893.
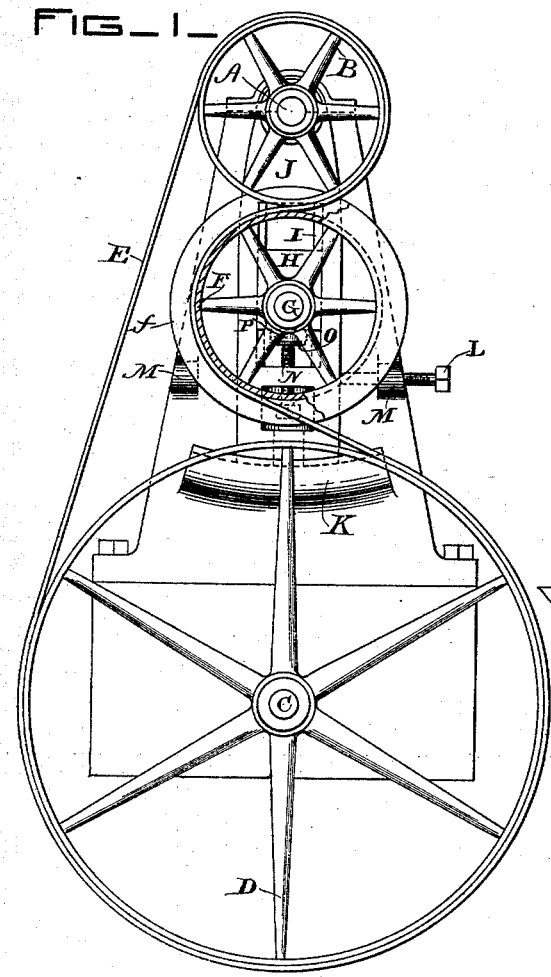
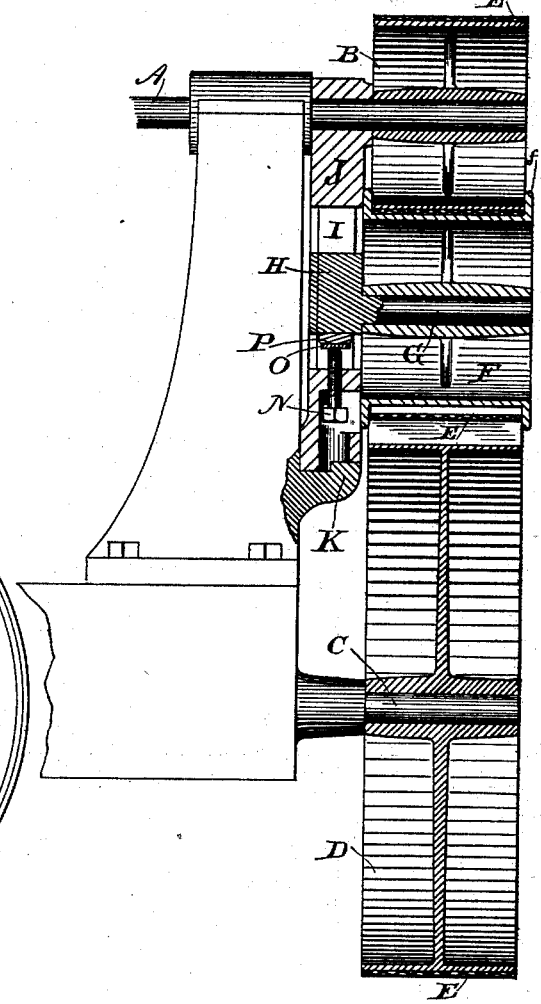
WITNESSES:
INVENTOR:
Henry W. Morton
ATTYS.

UNITED STATES PATENT OFFICE.

HENRY W. MORTON, OF BOSTON, MASSACHUSETTS, ASSIGNOR TO THE GENERAL ELECTRIC COMPANY, OF NEW YORK.

TRANSMITTING MECHANISM FOR MOTORS AND DYNAMOS.

SPECIFICATION forming part of Letters Patent No. 489,026, dated January 3, 1893.

Application filed September 1, 1890. Serial No. 363,661. (No model.)

*To all whom it may concern:*

Be it known that I, HENRY W. MORTON, a citizen of the United States, residing at Boston, county of Suffolk, and State of Massachusetts, have invented a new and useful Improvement in Transmitting Mechanism for Motors and Dynamos, of which the following is a specification.

The object of my invention is to provide a compact, durable, efficient and self-contained mechanism for transmitting between the high speed armature shaft of electric motors and dynamos and the comparatively slow speed counter-shaft.

In the accompanying drawings Figure 1 represents an end view of the motor or dynamo frame having my improved mechanism applied thereto. Fig. 2 is an actual vertical section through the mechanism.

A, is the armature shaft having armature pulley B secured thereto.

C is the counter-shaft and D the counter pulley. Motion is transmitted from one of these pulleys to the other by means of a short belt E of rubber or other suitable material. The slackness of the belt is taken up by an idler pulley F rotating on stud G which is secured to block H sliding in ways or guides I in the frame J. Frame J is journaled on the armature shaft as shown at its upper end and guided at its lower end by a grooved flange K on the frame of the machine so as to swing in an arc around the armature shaft as a center. A screw L passing through a lug M on the frame of the machine and bearing against the side of the swinging frame J enables one to apply any degree of tension upon the belt. Another screw N in the swinging frame bears against a plate O which in turn presses upon a rubber, or other elastic pad P and serves as a means whereby the idler puller may be pressed upward so as to pinch the belt between said idler and the armature shaft pulley. By this means I am enabled to obtain any desired degree of friction without increasing unduly the strain upon the belt. The idler pulley F is preferably provided with flanges *f* for the purpose of keeping the belt in place. It will be noticed that the belt encircles the large part of the periphery of both armature shaft and counter-shaft and in addition thereto is firmly pressed against the former which is more liable to slip, so that I have produced the strongest possible belt transmitter in the smallest space.

What I claim as new and desire to secure by Letters Patent is:

1. The combination of a driving and a driven pulley, one of which is smaller than the other, with an idler provided with means for adjusting it radially toward the smaller pulley so as to pinch the belt between the said idler and said smaller pulley.

2. The combination, with a frame of the machine of two rotating pulleys and a belt encircling the same, a swinging frame movable about the axis coincident with the axis of one of the said pulleys, an idler pulley carried by the said swinging frame, and adjusting mechanism for forcing said idler pulley toward the common axis of said swinging frame and pulley.

3. The combination, with the frame of the machine, of two rotating pulleys and a belt encircling the same, a swinging frame pivoted on an axis coincident with the axis of one of said pulleys and carrying an idler pulley, and means for adjusting said swinging frame and idler pulley both to and from and in an arc around the axis of the said swinging frame.

4. The combination, with two rotating pulleys and a belt encircling the same, of a swinging frame pivoted on an axis coincident with the axis of one of said pulleys, a block sliding on said swinging frame toward and from the said axis, and means for adjusting the block, substantially as described.

5. The combination, with two rotating pulleys and a belt encircling the same, of a swinging frame pivoted on the same axis on one of said pulleys, a block sliding on the frame toward and from said axis, and means for adjusting the angular position of the frame, substantially as set forth.

HENRY W. MORTON.

Witnesses:
    E. M. BENTLEY,
    W. M. TWOMBLY.